US012705761B2

(12) United States Patent
Poddar et al.

(10) Patent No.: US 12,705,761 B2
(45) Date of Patent: Aug. 11, 2026

(54) FEATURE POINT IDENTIFICATION IN SPARSE OPTICAL FLOW BASED TRACKING IN A COMPUTER VISION SYSTEM

(71) Applicant: TEXAS INSTRUMENTS INCORPORATED, Dallas, TX (US)

(72) Inventors: Deepak Kumar Poddar, Bangalore (IN); Anshu Jain, Bangalore (IN); Desappan Kumar, Bangalore (IN); Pramod Kumar Swami, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 31 days.

(21) Appl. No.: 18/414,772

(22) Filed: Jan. 17, 2024

(65) Prior Publication Data

US 2024/0153105 A1 May 9, 2024

Related U.S. Application Data

(63) Continuation of application No. 16/532,658, filed on Aug. 6, 2019, now Pat. No. 11,915,431, which is a (Continued)

(30) Foreign Application Priority Data

Dec. 30, 2015 (IN) ........................... 7079/CHE/2015

(51) Int. Cl.
*G06T 7/246* (2017.01)

(52) U.S. Cl.
CPC .......... *G06T 7/246* (2017.01); *G06T 2200/28* (2013.01); *G06T 2207/20016* (2013.01); *G06T 2207/30241* (2013.01)

(58) Field of Classification Search
None
See application file for complete search history.

(56) References Cited

U.S. PATENT DOCUMENTS 5,953,055 A * 9/1999 Huang .................. H04N 7/188 348/149
6,037,988 A 3/2000 Gu et al.
(Continued)

FOREIGN PATENT DOCUMENTS

CN 101266689 B 9/2010
CN 108470354 A 8/2018
(Continued)

OTHER PUBLICATIONS

Mihir Mody et al, "High Performance Front Camera ADAS Applications on TI's TDA3X Platform", 2015 IEEE 22nd International Conference on High Performance Computing (HiPC), Dec. 16-19, 2015, Bangalore, KA, India, pp. 1-8.
(Continued)

*Primary Examiner* — Jiangeng Sun
(74) *Attorney, Agent, or Firm* — Michelle F. Murray; Frank D. Cimino

(57) ABSTRACT

A method for sparse optical flow based tracking in a computer vision system is provided that includes detecting feature points in a frame captured by a monocular camera in the computer vision system to generate a plurality of detected feature points, generating a binary image indicating locations of the detected feature points with a bit value of one, wherein all other locations in the binary image have a bit value of zero, generating another binary image indicating neighborhoods of currently tracked points, wherein locations of the neighborhoods in the binary image have a bit value of zero and all other locations in the binary image have a bit value of one, and performing a binary AND of the two binary images to generate another binary image, wherein
(Continued)

locations in the binary image having a bit value of one indicate new feature points detected in the frame.

17 Claims, 6 Drawing Sheets

Related U.S. Application Data continuation of application No. 15/266,149, filed on Sep. 15, 2016, now Pat. No. 10,460,453.

(56) References Cited

U.S. PATENT DOCUMENTS 6,192,156 B1 2/2001 Moorby
7,136,518 B2* 11/2006 Griffin ................... G01N 21/31 382/128
7,227,893 B1* 6/2007 Srinivasa ......... G08B 13/19602 348/169
2002/0051057 A1* 5/2002 Yata ...................... G01S 3/7864 348/169
2003/0081836 A1* 5/2003 Averbuch .................. G06T 7/12 382/199
2003/0165259 A1 9/2003 Balent et al.
2004/0096119 A1* 5/2004 Williams .................. G06T 7/97 382/218
2006/0008118 A1* 1/2006 Matsuoka .............. G06V 10/30 382/103
2008/0310729 A1* 12/2008 Yoshino ........... G06V 30/18143 382/190
2009/0136158 A1* 5/2009 Tamura ................ H04N 13/122 382/293
2009/0225183 A1* 9/2009 Tamura ................... G06T 7/194 348/222.1
2012/0129605 A1* 5/2012 Livet ....................... G06F 3/017 463/39
2014/0072213 A1 3/2014 Paiton et al.
2014/0185925 A1 7/2014 Datta et al.
2014/0232893 A1 8/2014 Lee et al.
2015/0139484 A1* 5/2015 Wu ......................... G06T 7/223 382/103
2015/0355309 A1* 12/2015 Aspiras ................. G01S 3/7864 348/169
2016/0321495 A1 11/2016 Chukka et al.
2017/0068844 A1 3/2017 Friedland

FOREIGN PATENT DOCUMENTS

JP 2002150295 A 5/2002
JP 2011008687 A 1/2011
WO 2015086537 A1 6/2015

OTHER PUBLICATIONS

Edward Rosten and Tom Drummond, "Machine Learning for High-Speed Corner Detection", Proceedings of the 9th European Conference on Computer Vision, vol. Part I, May 7-13, 2006, Graz, Austria, pp. 430-443.

Macheslav Tarasenko and Dong-Won Park, "Detection and Tracking over Image Pyramids using Lucas and Kanade Algorithm", International Journal of Applied Engineering Research, vol. 11, No. 9, 2016, pp. 6117-6120.

Chris Harris and Mike Stephens, "A Combined Corner and Edge Detector", Proceedings of Fourth Alvey Vision Conference, 1988, pp. 147-151.

Bruce D. Lucas and Takeo Kanade, "An Iterative Image Registration Technique with an Application to Stereo Vision", Proceedings of 1981 DARPA Image Understanding Workshop, Apr. 1981, pp. 121-130.

"TDA3x SoC Processors for Advanced Driver Assist Systems (ADAS) Technical Brief", Texas Instruments, Inc., SPRT704A, Oct. 2014, revised Oct. 2014.

Calonder, M.; Lepetit, V.; Strecha, C.; Fua, P.; Brief: Binary robust independent elementary features. In Proceedings of the European Conference on Computer Vision (ECCV 2010), Heraklion, Crete, Greect, Sep. 5-11, 2010; vol. 6314, pp. 778-792.

Machine Translation for JP2011008687A.

Machine Translation for CN108470354A.

Machine Translation for CN101266689B.

Machine Translation for JP2002150295A.

* cited by examiner

DETECTED FEATURE POINTS BINARY IMAGE

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |
| 2 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 1 | 0 | 0 | 1 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

504

DETECTED FEATURE POINTS (t-1)

| | | | | | | | | |
|---|---|---|---|---|---|---|---|---|
| 3 | 6 | 12 | 21 | 22 | 25 | 27 | 29 | |
| 2 | 6 | 6 | 8 | 2 | 2 | 7 | 1 | |

FEATURE POINT IDENTIFICATION IN SPARSE OPTICAL FLOW BASED TRACKING IN A COMPUTER VISION SYSTEM

CROSS-REFERENCE TO RELATED APPLICATIONS

This application is a continuation of and claims priority to U.S. application Ser. No. 16/532,658, filed Aug. 6, 2019, which is a continuation of and claims priority to U.S. application Ser. No. 15/266,149, filed Sep. 15, 2016 (now U.S. Pat. No. 10,460,453), issued on Oct. 29, 2019, which claims priority to Indian Provisional Patent Application No. 7079/CHE/2015 filed Dec. 30, 2015, all of which are hereby incorporated herein by reference in their entireties.

BACKGROUND OF THE DISCLOSURE

Field of the Disclosure

Embodiments of the present disclosure generally relate to a computer vision system, and more specifically relate to new feature point identification in sparse optical flow based tracking in a computer vision system.

Description of the Related Art

A new class of embedded safety systems, referred to as advanced driver assistance systems (ADAS), has been introduced into vehicles to reduce human operation error. Such systems may provide functionality such as rear-view facing cameras, electronic stability control, collision warning, and vision-based pedestrian detection systems. Many of these systems use a monocular camera and rely on real time computer vision processing to detect and track objects in the field of view of the camera. Optical flow based tracking is a key component in computer vision processing such as, for example, structure from motion (SfM), object detection, ego motion, video compression, and video stabilization.

One approach to optical flow based tracking that may be used in embedded safety systems is sparse optical flow based tracking. Sparse optical flow based tracking is a feature-based approach in which features, e.g., image edges, corners, etc., are identified and tracked across consecutive frames captured by a monocular camera. Given the real time processing requirements in embedded safety systems, performance improvements in aspects of sparse optical flow based tracking are desirable.

SUMMARY

Embodiments of the present disclosure relate to new feature point identification in sparse optical flow based tracking in a computer vision system. In one aspect, a method for sparse optical flow based tracking in a computer vision system is provided that includes detecting feature points in a frame captured by a monocular camera in the computer vision system to generate a plurality of detected feature points, generating a first binary image indicating locations of the detected feature points with a bit value of one, wherein all other locations in the first binary image have a bit value of zero, generating a second binary image indicating neighborhoods of currently tracked points, wherein locations of the neighborhoods in the second binary image have a bit value of zero and all other locations in the second binary image have a bit value of one, and performing a binary AND of the first binary image and the second binary image to generate a third binary image, wherein locations in the third binary image having a bit value of one indicate new feature points detected in the frame.

In one aspect, a computer vision system is provided that includes a monocular camera configured to capture a two dimensional (2D) frame of a scene, a feature point detection component configured to detect a plurality of feature points in a frame, and a new feature point identification component configured to identify new feature points in the detected plurality of feature points by performing a binary AND of a first binary image and a second binary image to generate a third binary image, wherein locations in the first binary image having a bit value of one indicate locations of the detected plurality of feature points and all other locations in the first binary image have a bit value of zero, and wherein locations in the second binary image having a bit value of zero indicate neighborhoods of currently tracked feature points and all other locations in the second binary image have a bit value of one, and wherein locations of the third binary image having a bit value of one indicate new feature points.

In one aspect, a computer readable medium storing software instructions that, when executed by one or more processors comprised in a computer vision system, cause the computer vision system to execute a method for sparse optical flow based tracking. The software instructions include instruction to cause detection of feature points in a frame captured by a monocular camera in the computer vision system to generate a plurality of detected feature points, generation of a first binary image indicating locations of the detected feature points with a bit value of one, wherein all other locations in the first binary image have a bit value of zero, generation of a second binary image indicating neighborhoods of currently tracked points, wherein locations of the neighborhoods in the second binary image have a bit value of zero and all other locations in the second binary image have a bit value of one, and performance of a binary AND of the first binary image and the second binary image to generate a third binary image, wherein locations in the third binary image having a bit value of one indicate new feature points detected in the frame.

BRIEF DESCRIPTION OF THE DRAWINGS

Particular embodiments will now be described, by way of example only, and with reference to the accompanying drawings:

FIGS. 4 and FIGS. 5A-5C are examples illustrating new feature point identification;

DETAILED DESCRIPTION OF EMBODIMENTS OF THE DISCLOSURE

Figure 1:
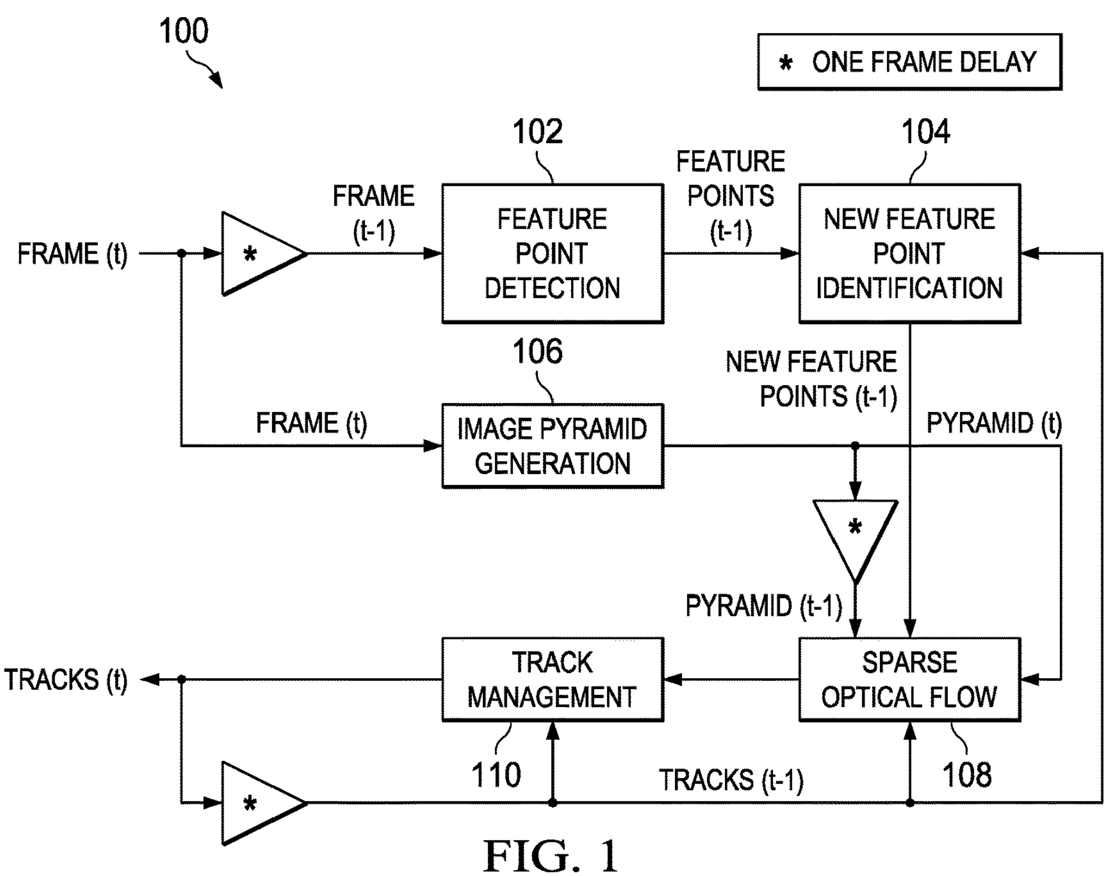
FIG. 1 is a block diagram illustrating an example sparse optical flow based tracking system that may be used in a computer vision system.

Specific embodiments of the disclosure will now be described in detail with reference to the accompanying figures. Like elements in the various figures are denoted by like reference numerals for consistency.

As previously mentioned, one approach to optical flow based tracking that may be used in embedded safety systems is sparse optical flow based tracking. In this approach, features, which may also be referred to as interest points or key points or feature points, are identified and tracked as they move from frame to frames in consecutive frames captured by a monocular camera.

Figure 2:
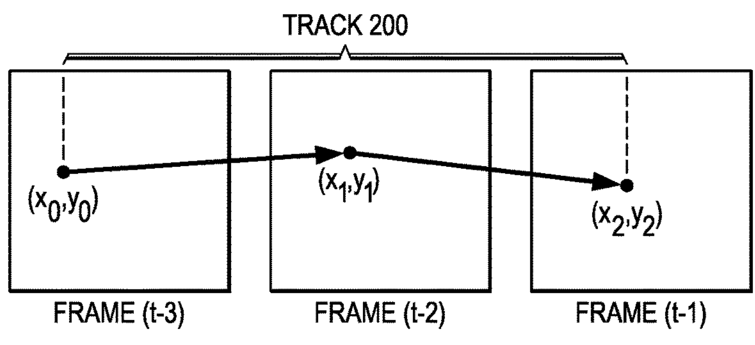
FIG. 2 is an example illustrating a track.

FIG. 1 is a block diagram illustrating an example sparse optical flow based tracking system 100 that may be used in a computer vision system. At a high level, the sparse optical flow based tracking system 100 detects and tracks two dimensional (2D) locations of feature points across consecutive frames, storing the 2D locations in tracks corresponding to the feature points. Thus, a track is a sequence of 2D frame coordinates of a feature point over time. FIG. 2 is a simple example illustrating a track 200. In this example, a feature point was initially detected in frame (t−3) at coordinates $(x_0,y_0)$, and was tracked across the two subsequent frames at coordinates $(x_1,y_1)$ in frame (t−2) and at coordinates $(x_2,y_2)$ in frame (t−1). Thus, the track 200 corresponding to the feature point is $[(x_0,y_0), (x_1,y_1), (x_2,y_2)]$.

Referring again to FIG. 1, the sparse optical flow based tracking system 100 includes a feature point detection component 102, a new feature point identification component 104, an image pyramid generation component 106, a sparse optical flow component 108, and a track management component 110. The input to the system is a frame captured by a monocular camera and the output is a set of tracks corresponding to feature points.

The feature point detection component 102 is configured to detect feature points in a frame (t−1). Any suitable technique for feature point detection may be used. For example, the feature point detection may be based on Harris corner detection or the features from accelerated segment test (FAST) detection. Harris corner detection is described, for example, in C. Harris and M. Stephens, "A Combined Corner and Edge Detector," Proceedings of Fourth Alvey Vision Conference, Manchester, UK, pp. 147-151, 1988. FAST is described, for example, in E. Rosten and T. Drummond, "Machine Learning for High Speed Corner Detection," Proceedings of 9$^{th}$ European Conference on Computer Vision, Vol. 1, Graz, Austria, May 7-13, 2006, pp. 430-443.

The new feature point identification component 104 is coupled to the feature point detection component 102 to receive the detected feature points and to the track management component 110 to receive the most recent 2D locations for the currently tracked feature points, i.e., the 2D locations of the tracked feature points in frame (t−1). The new feature point identification component 104 is configured to analyze the detected feature points to identify any new feature points in the detected feature points, i.e., to eliminate any detected feature points that are in close proximity of the last tracked location of a feature point currently being tracked. More specifically, the new feature point identification component 104 is configured to identify a feature point detected by the feature point detection component 102 as a new feature when the 2D coordinates of the detected feature point are not within a small neighborhood of the most recent 2D coordinates of any tracked feature point. The size and shape of the neighborhood may be any suitable size and shape and may be determined empirically. In some embodiments, the neighborhood may be a 3×3 or a 5×5 square of pixels. The neighborhood used for new feature point identification and the neighborhood used by sparse optical flow may or may not be the same.

Figure 3:
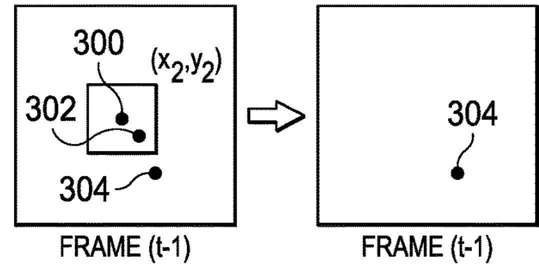
FIG. 3 is an example illustrating new feature point identification.

FIG. 3 is a simple example illustrating new feature point identification. This example is a continuation of the example of FIG. 2. The feature points 302 and 304 are feature points detected in frame (t−1) by the feature point detection component 102. The point 300 is the last tracked location of the feature point corresponding to the track 200. The box around the point 300 represents the neighborhood around the point 300. The detected feature point 302 lies within the neighborhood and will be ignored by the new feature point identification component 104 while the detected feature point 304 is not in the neighborhood and will be identified as a new feature point for the frame (t−1).

New feature point identification is performed because any feature points detected by the feature point detection component 102 that lie within the neighborhoods of already tracked feature points do not provide any additional information to algorithms that use the tracking information as a detected feature point in the neighborhood of a tracked feature point is likely to be the tracked feature point and does not need to be tracked separately. Computation cycles spent tracking such feature points are redundant and can be better utilized by components in the computer vision system. Operation of the new feature point identification component 104 is explained in more detail herein in reference to FIGS. 4 and FIGS. 5A-5C.

Referring again to FIG. 1, the image pyramid generation component 106 is configured to generate an image pyramid for a frame (t). That is, the image pyramid generation component 106 is configured to perform a multi-resolution decomposition of a frame to generate a pyramid of images of differing resolutions. Any suitable number of images in the image pyramid and any suitable resolutions of the images may be used. For example, the image pyramid may be a set of images in which each image is down-sampled by a factor of two both horizontally and vertically with respect to the image of the next higher resolution in the pyramid. The image pyramid enables analysis of the scene captured in the original frame at different "sizes", e.g., over different distances.

The sparse optical flow component 108 is coupled to the image pyramid generation component 106 to receive image pyramids for the most recent frame (t) and the previous frame (t−1), to the new feature point identification component 104 to receive the new feature points for the previous frame (t−1), and to the track management component 110 to receive the most recent 2D locations for the currently tracked feature points, i.e., the 2D locations of the tracked feature points in frame (t−1). The sparse optical flow component 108 is configured to perform point correspondence between the most recent frame and the previous frame using an image pyramid based sparse optical flow algorithm. An example of such an algorithm is described in V. Tarasenko and D Park, "Detection and Tracking over Image Pyramids using Lucas and Kanade Algorithm," International Journal of Applied Engineering Research, Vol. 11, No. 9, pp. 6117-6120, 2016.

In general, sparse optical flow is applied to attempt to match the new feature points (t−1) and the currently tracked feature points, i.e., the most recent 2D locations from tracks (t−1), with 2D locations in the most recent frame (t). The output of the sparse optical flow component 108 is the new feature points (t−1) and currently tracked feature points along with the 2D locations of the corresponding matching points in the current frame (t). For those new feature points (t−1) and currently tracked feature points for which no match was found in frame (t), a null 2D location is indicated.

The track management component 110 is coupled to the sparse optical flow component 108 to receive the matched points. The track management component 110 is configured to manage the tracks, i.e., to start new tracks, to extend existing tracks, and to delete tracks that are no longer valid. The track management component 110 is configured to start a new track for a new feature point when the sparse optical flow component 108 indicates that a match was found for the new feature point in the most recent frame. In this latter case, the new track includes the 2D coordinates of the feature point in frame (t−1) and the 2D coordinates of the matching point in frame (t).

The track management component 110 is also configured to extend an existing track when the sparse optical flow component 108 indicates that a match was found in the most recent frame for the feature point corresponding to the track. In this latter case, the 2D coordinates of the matching point are added to the track. The track management component 110 is also configured to delete an existing track when the sparse optical flow component 108 does not find a match in the most recent frame for the feature point corresponding to the track. In addition, the track management component 110 is configured to provide the most recent 2D locations for the currently tracked feature points, i.e., the 2D locations of the tracked feature points in frame (t−1) to the new feature point identification component 104 and the sparse optical flow component 108.

Figure 4:
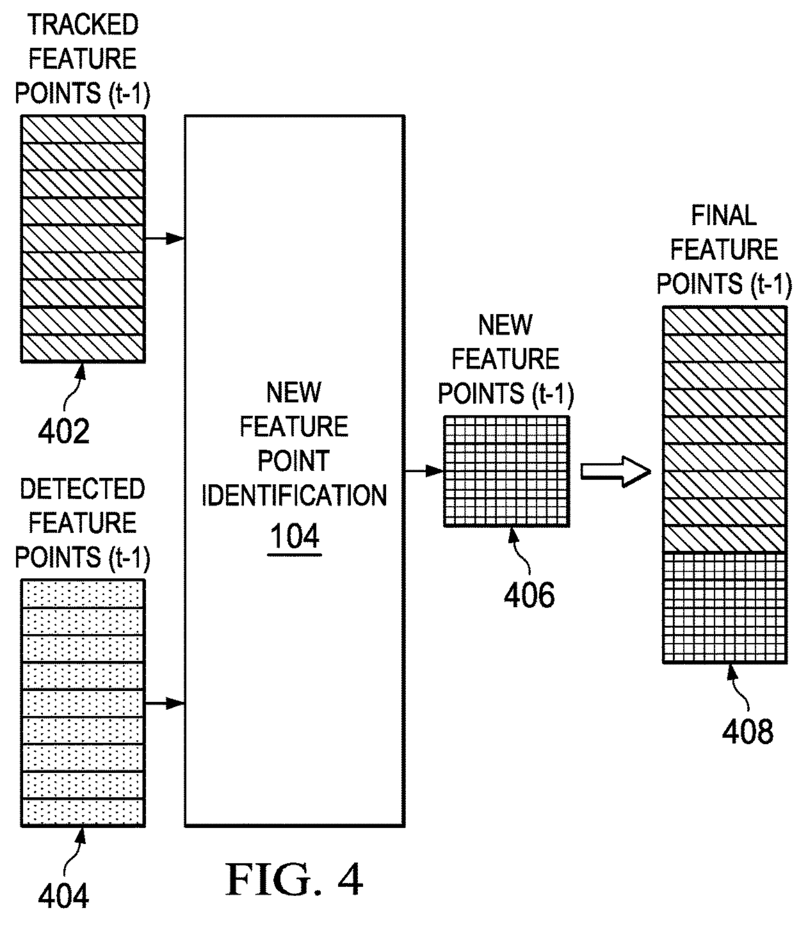

FIG. 4 is an example illustrating the operation of the new feature point identification component 104. As previously described, the inputs to the new feature point identification component 104 are the 2D locations of the currently tracked feature points 402 and the feature points 404 detected in frame (t−1). The new feature point identification component 104 is configured to compare the detected feature points 404 to the currently tracked feature points to identify any detected feature points 404 that are new. As previously described, if a detected feature point is not within a small neighborhood of a tracked feature point, the new feature point identification component 104 is configured to identify the detected feature point as a new feature point. The output of the new feature point identification component 104 is the new feature points 406 detected in the previous frame (t−1), and the final feature points 408 for the frame (t−1) to be processed by the sparse optical flow component 108 are the new feature points 406 and the tracked feature points 402.

In the prior art, one approach to identifying new feature points in the detected feature points is to do a point by point search in which each detected feature point is compared to each of the tracked feature points to determine whether or not the detected feature point is within the small neighborhood of any of the tracked feature points. This approach can be very computationally intensive if the number of detected feature points and the number of tracked feature points is large, i.e., the problem is of complexity O(M*N), where M is the number of detected feature points and N is the number of tracked feature points. For example, if N=9000 and M=3000 and one cycle is used for each comparison of two 2D points, the total cycle time required to identify the new feature points may be approximately 27 mega cycles, which may be unacceptable given the real time processing requirements of embedded safety systems.

Embodiments of the disclosure provide for new feature point identification with less computational complexity. Instead of comparing each detected feature point to a neighborhood around each tracked feature point, the new feature point identification component 104 is configured to generate two binary images of the same dimensions as the frame size. In some embodiments, in one of the binary images, i.e., the detected feature point binary image, any bit locations that correspond to the location of a detected feature point are set to one and all other bit locations are set to zero. In the other binary image, i.e., the tracked feature point binary image, any bit locations that correspond to a neighborhood around a tracked feature point are set to zero and all other bit locations are set to one.

The new feature point identification component 104 is further configured to perform a binary AND operation between the respective bit locations of the two binary images to generate a new feature point binary image in which a one in a bit location indicates a new feature point. The new feature point identification component 104 is further configured to generate the new feature points 406 by outputting the 2D coordinates of each bit location in the new feature point binary image having a value of one.

Figure 5A:
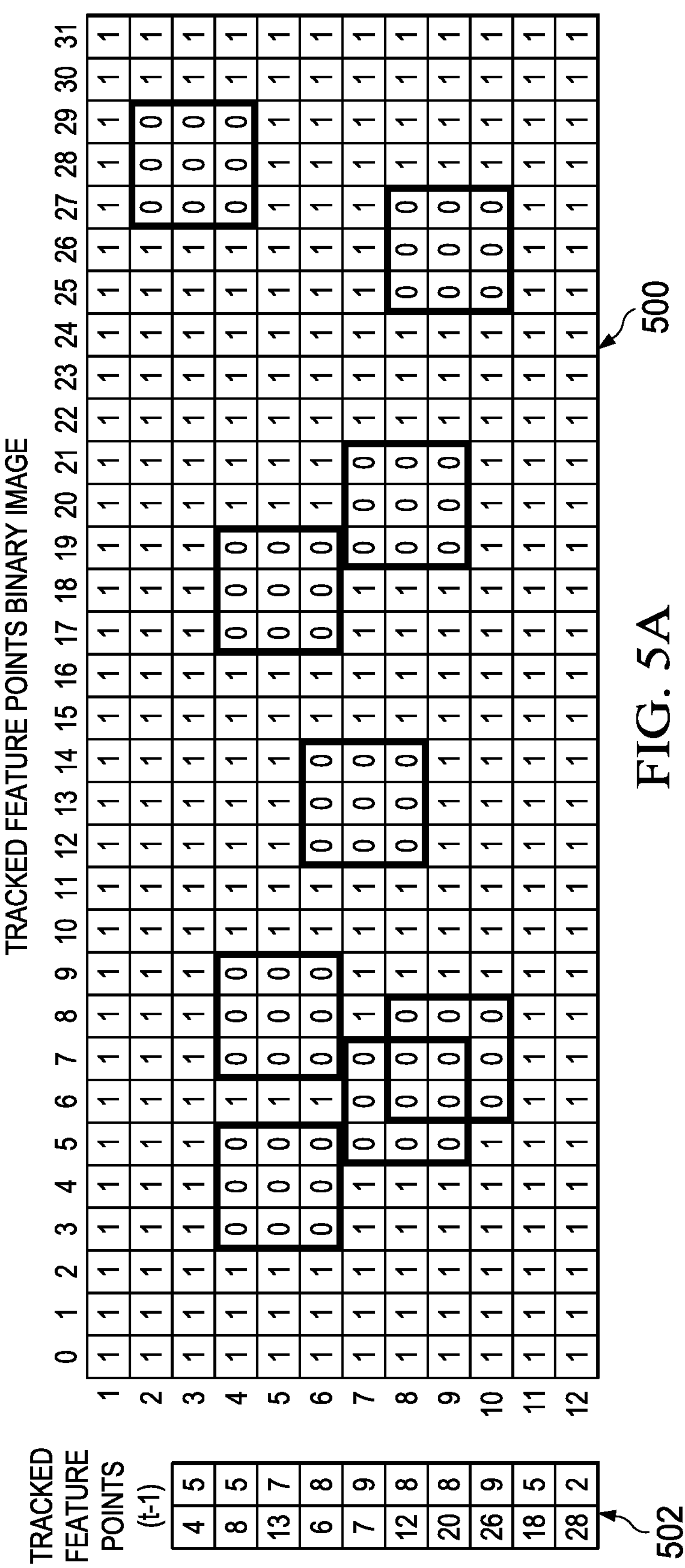
Figure 5C:
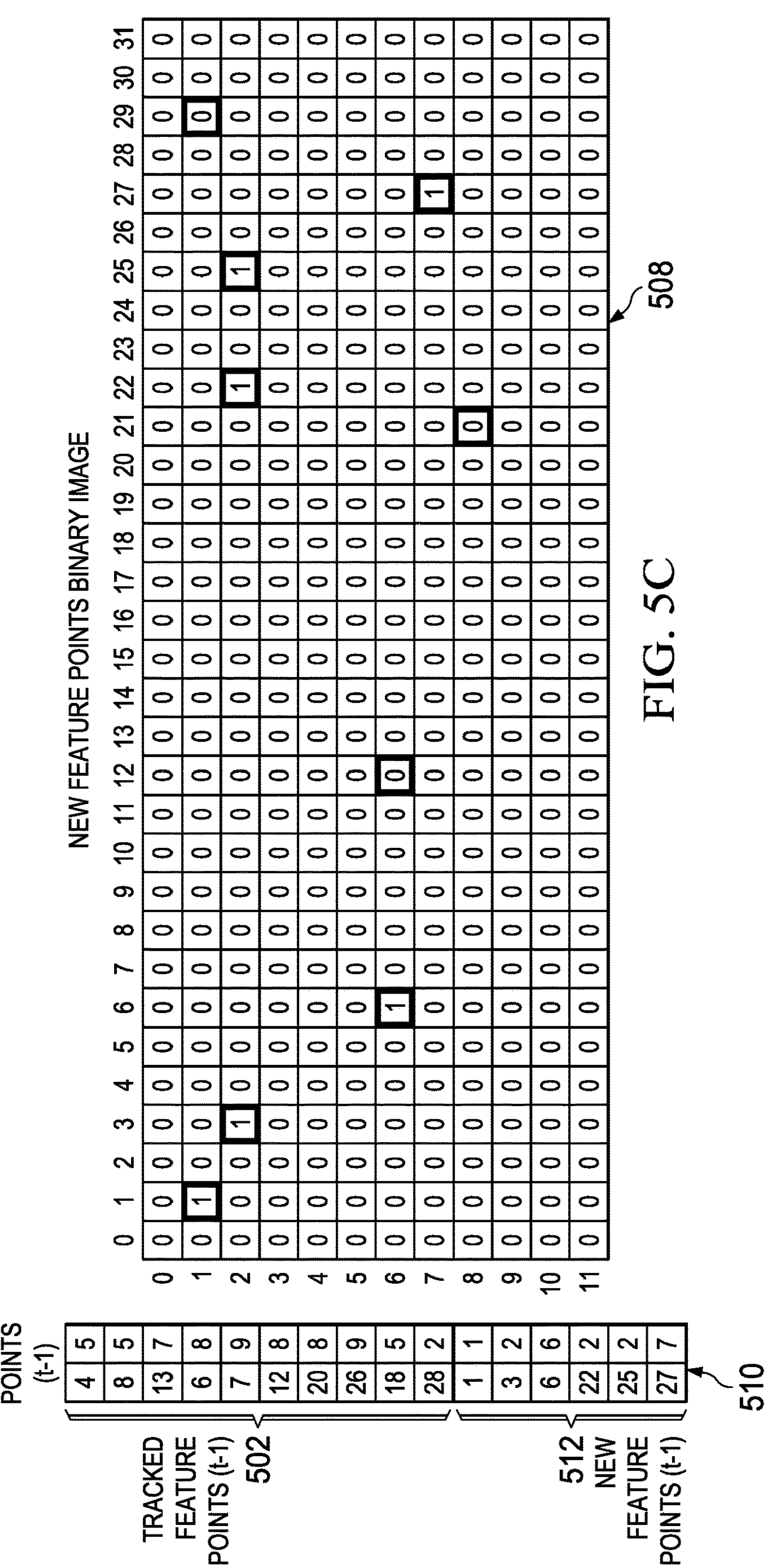

FIGS. 5A-5C are a simple example illustrating the operation of the new feature point identification component 104 in some embodiments. FIG. 5A shows an example tracked feature points binary image 500 for the tracked feature points 502. In this example, there are ten tracked feature points and the neighborhood around a tracked feature point is assumed to be 3×3 points. FIG. 5B shows the corresponding detected feature points binary image 504 for the detected feature points 506. In this example, there are eight detected feature points. FIG. 5C shows the result of the binary AND operation between the tracked feature points binary image 500 and the detected feature points binary image 504, i.e., the new feature points image 508. The new feature points image 508 is then converted to a set of coordinates 512 for the new feature points in which the set includes the coordinates of each location in the image containing a one. Note that three of the detected feature points 506 are within the neighborhood of a tracked feature point 502 and are not included the new feature points 512 of the final feature points 510.

In some embodiments, a direct memory access (DMA) controller may be programmed to accelerate the generation of the tracked feature points binary image. While feature detection is being performed by the feature detection component 102, the DMA controller may perform chained operations to write the zero bit values in the neighborhoods of a tracked feature points binary image that is prefilled with one bit values. When the feature point detection is complete, the detected feature points image can be generated by the new feature point identification component 104. Once both binary images are generated, the binary AND operation can be performed. In some embodiments, the output of the feature detection component 102 may be the detected feature points image.

In some embodiments, the binary AND comparisons may be implemented on a single-instruction-multiple-data (SIMD) processor to accelerate the computation of the new feature point binary image. Assuming an 8-way SIMD processor, eight bytes can undergo an AND operation in one cycle. Thus, for a one mega pixel image, the total cycle time to AND the binary images will be ⅛ mega cycles. In the prior art approach to identifying new feature points, the cycle time depends on the number of detected feature points and the number of tracked feature points. In these embodiments, the cycle time depends on the image resolution and the number of bytes supported by the SIMD AND instruction.

Figure 6:
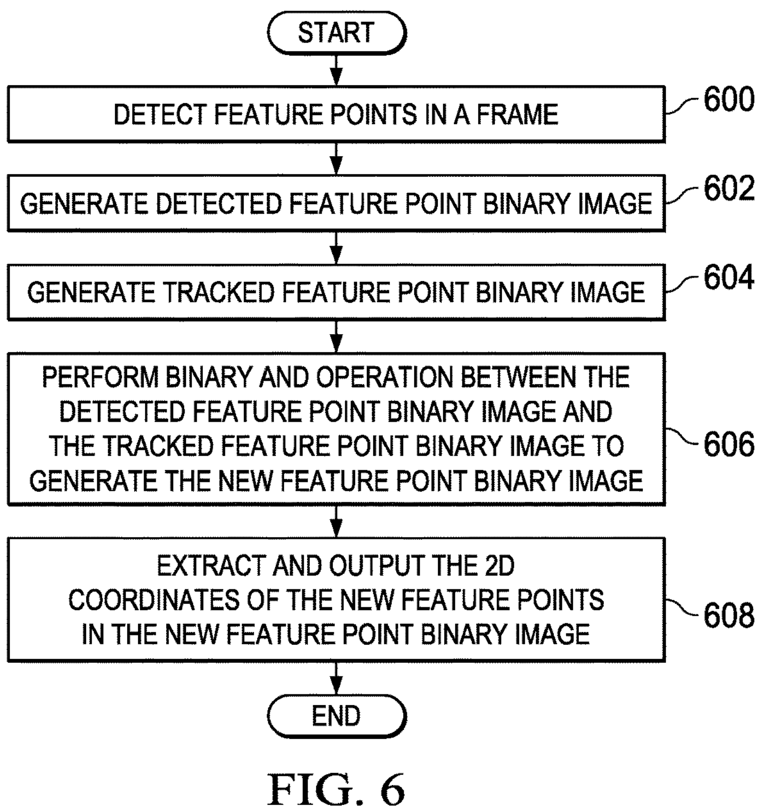
FIG. 6 is a flow diagram of a method for new feature point detection in a computer vision system.

FIG. 6 is a flow diagram of a method for new feature point detection in a computer vision system. Initially, feature points are detected 600 in a frame captured by a monocular camera. Feature point detection is previously described herein. A detected feature point binary image is generated 602 based on the detected feature points and a tracked feature point binary image is generated 604 based on the currently tracked feature points. These binary images are previously described herein. A binary AND operation is performed 606 between the detected feature point binary image and the tracked feature point binary image to generate the new feature point binary image. The new feature point binary image is previously described herein. Finally, the 2D coordinates of the new feature points in the new feature point binary image are extracted 608 from the new feature point binary image and output for further processing.

Figure 7:
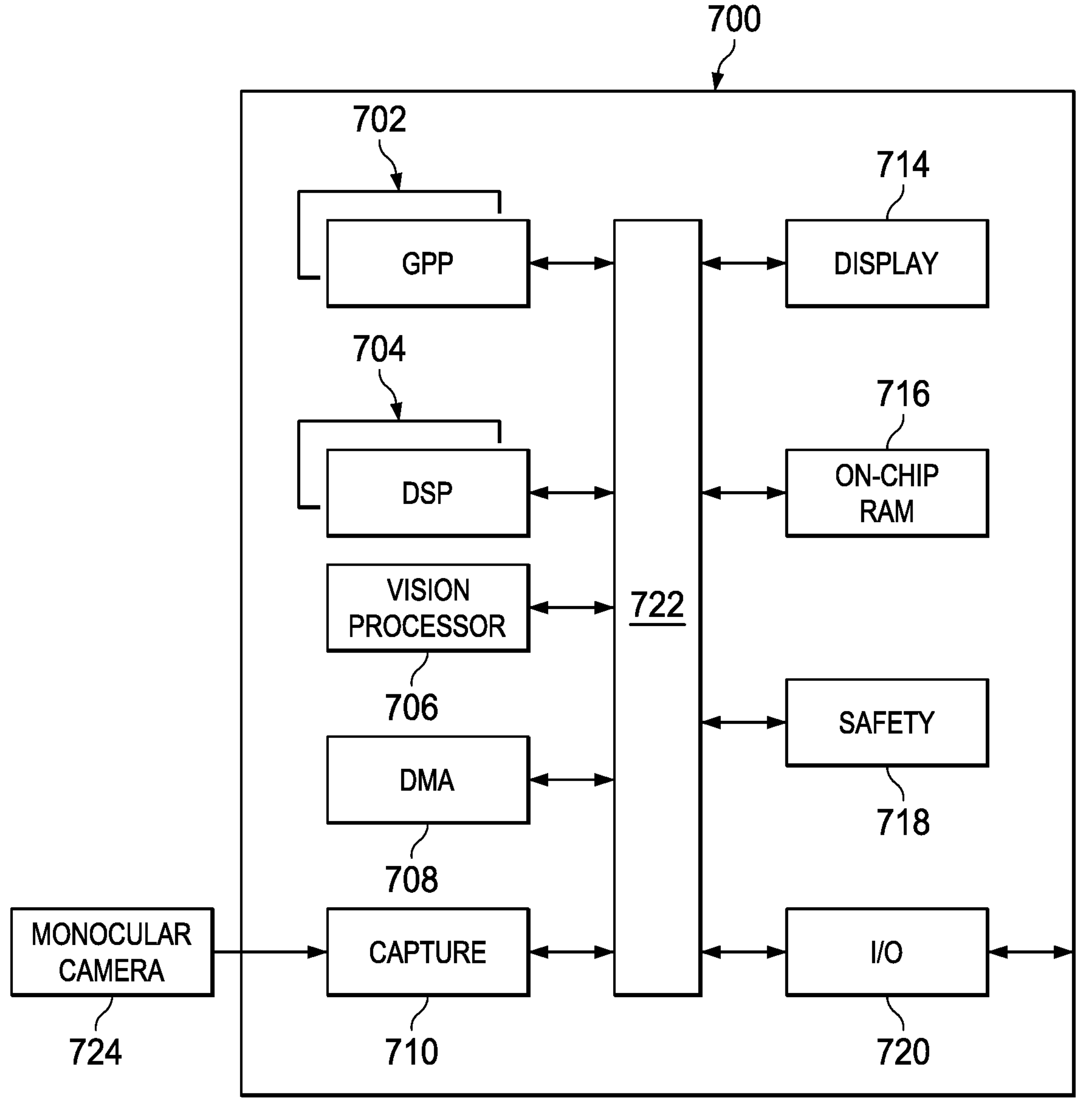
FIG. 7 is a high level block diagram of an example multiprocessor system-on-a-chip (SOC) configured for use in a monocular camera-based automotive safety application.

FIG. 7 is a high level block diagram of an example multiprocessor system-on-a-chip (SOC) 700 configured for use in a monocular camera-based ADAS. In particular, the example SOC 700 is an embodiment of the TDA3X SOC available from Texas Instruments, Inc. A high level description of the components of the SOC 700 is provided herein. More detailed descriptions of example components may be found in M. Mody, et al., "High Performance Front Camera ADAS Applications on TI's TDA3X Platform," Proceedings of 2015 IEEE 22$^{nd}$ International Conference on High Performance Computing, Dec. 16-19, 2015, Bangalore, India, pp. 456-463, and "TDA3x SOC Processors for Advanced Driver Assist Systems (ADAS) Technical Brief," Texas Instruments, SPRT704A, October, 2014, pp. 1-6, which are incorporated by reference herein.

The SOC 700 includes dual general purpose processors (GPP) 702, dual digital signal processors (DSP) 704, and a vision processor 706 coupled via a high speed interconnect 722. The SOC 700 further includes a direct memory access (DMA) controller 708, a camera capture component 710 coupled to a monocular camera 724, a display management component 714, on-chip random access (RAM) memory 716, e.g., a computer readable medium, and various input/output (I/O) peripherals 720 all coupled to the processors via the interconnect 722. In addition, the SOC 700 includes a safety component 718 that includes safety related functionality to enable compliance with automotive safety requirements. Such functionality may include support for CRC (cyclic redundancy check) of data, clock comparator for drift detection, error signaling, windowed watch-dog timer, and self testing of the SOC for damage and failures. Software implementing sparse optical flow based tracking as described herein in which frames captured by the monocular camera 724 are used may be stored in the memory 716 and may execute on one or more programmable processors of the SOC 700. In some embodiments, the DMA controller 708 may be programmed to accelerate generation of the tracked feature points binary image as previously described herein.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which the spare optical flow based tracking used an image pyramid based sparse optical flow algorithm. One of ordinary skill in the art will understand embodiments in which other suitable sparse optical flow algorithms are used.

In another example, embodiments have been described herein in which the sparse optical flow based tracking may be implemented as software instructions executed on processors in a multiprocessor SOC. One of ordinary skill in the art will understand that the sparse optical flow based tracking may be implemented as any suitable combination of software, firmware, and/or hardware. For example, some of the functionality may be implemented in one or more hardware accelerators, application specific integrated circuits (ASICs), field-programmable gate arrays (FPGAs), etc.

In another example, embodiments have been described herein in reference to automotive safety systems. One of ordinary skill in the art will understand embodiments for other computer vision applications, such as, for example, industrial applications, robotics, and consumer applications such as vacuum cleaners.

Software instructions implementing all or portions of methods described herein may be initially stored in a computer-readable medium and loaded and executed by one or more processors. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:

generating a first image to indicate locations of a first set of points detected based on a first frame, wherein the locations of the first set of points are indicated by a first value, and wherein a remainder of the first image is indicated by a second value;

generating a second image to indicate neighborhoods each of which surrounds one point of a second set of points detected based on a second frame, wherein the neighborhoods are indicated in the second image by the second value, and wherein a remainder of the second image is indicated by the first value; and generating a third image based on the first image and the second image to indicate locations of a subset of the first set of points that are excluded from the neighborhoods, wherein the locations of the subset of the first set of points and a remainder of the third image are indicated by different values.

2. The method of claim 1, wherein the second frame is captured prior to the first frame.

3. The method of claim 1, comprising:

determining a set of coordinates for each point of the subset of the first set of points based on the third image.

4. The method of claim 1, wherein each of the neighborhoods corresponds to a N×N pixel area, and N is an integer.

5. The method of claim 1, wherein the first set of points corresponds to a first set of feature points detected within the first frame, and wherein the second set of points corresponds to a second set of feature points detected within the second frame.

6. The method of claim 1, wherein the first value is a first binary value and the second value is a second binary value.

7. The method of claim 6, wherein the first binary value is a binary one and the second binary value is a binary zero.

8. A non-transitory computer readable medium storing instructions that, when executed by one or more processors, cause the one or more processors to:

generate a first image to indicate locations of a first set of points detected based on a first frame, wherein the locations of the first set of points are indicated by a first value, and wherein a remainder of the first image is indicated by a second value;

generate a second image to indicate neighborhoods each of which surrounds one point of a second set of points detected based on a second frame, wherein the neighborhoods are indicated in the second image by the second value, and wherein a remainder of the second image is indicated by the first value; and generate a third image based on the first image and the second image to indicate locations of a subset of the first set of points that are excluded from the neighborhoods, wherein the locations of the subset of the first set of points and a remainder of the third image are indicated by different values.

9. The non-transitory computer readable medium of claim 8, wherein the second frame is captured by a camera prior to the first frame.

10. The non-transitory computer readable medium of claim 8, wherein to generate the third image, the instructions cause the one or more processors to:

determine a set of coordinates for each point of the subset of the first set of points based on the third image.

11. The non-transitory computer readable medium of claim 8, wherein each of the neighborhoods corresponds to a N×N pixel area, and N is an integer.

12. The non-transitory computer readable medium of claim 8, wherein the first value is a first binary value and the second value is a second binary value.

13. The non-transitory computer readable medium of claim 12, wherein the first binary value is a binary one and the second binary value is a binary zero.

14. A system, comprising:

memory storing instructions; and one or more processors configured to execute the instructions to:

generate a first image to indicate locations of a first set of points detected based on a first frame, wherein the locations of the first set of points are indicated by a first value and a remainder of the first image is indicated by a second value;

generate a second image to indicate neighborhoods each of which surrounds one point of a second set of points detected based on a second frame, wherein the neighborhoods are indicated in the second image by the second value and a remainder of the second image is indicated by the first value; and generate a third image based on the first image and the second image to indicate locations of a subset of the first set of points that are excluded from the neighborhoods, wherein the locations of the subset of the first set of points are indicated by a value different from a remainder of the third image.

15. The system of claim 14, wherein each of the neighborhoods corresponds to a N×N pixel area centered around the one point of the second set of points, and N is an integer.

16. The system of claim 14, wherein the first value is a first binary value and the second value is a second binary value.

17. The system of claim 16, wherein the first binary value is a binary one and the second binary value is a binary zero.

* * * * *